United States Patent
Glovatsky et al.

(10) Patent No.: US 7,070,229 B2
(45) Date of Patent: Jul. 4, 2006

(54) UNDERHOOD ELECTRONIC INTERIOR INTEGRATION

(75) Inventors: Andrew Glovatsky, Plymouth, MI (US); Jay Baker, West Bloomfield, MI (US); Myron Lemecha, Dearborn, MI (US); Lawrence Kneisel, Novi, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 171 days.

(21) Appl. No.: 10/371,465

(22) Filed: Feb. 21, 2003

(65) Prior Publication Data

US 2004/0164589 A1 Aug. 26, 2004

(51) Int. Cl.
*B62D 25/08* (2006.01)

(52) U.S. Cl. ...................................... 296/192

(58) Field of Classification Search ............... 296/192, 296/70, 208; 174/251, 254, 268; 361/749, 361/750, 751
See application file for complete search history.

(56) References Cited

U.S. PATENT DOCUMENTS

| | | | | | |
|---|---|---|---|---|---|
| 3,579,067 | A | * | 5/1971 | Riester | 318/444 |
| 3,596,243 | A | * | 7/1971 | Leibholz | 307/10.4 |
| 3,611,287 | A | * | 10/1971 | Hoff et al. | 307/10.4 |
| 3,639,938 | A | * | 2/1972 | Golden | 15/250.06 |
| 4,065,170 | A | | 12/1977 | Fabian et al. | 296/37.1 |
| 4,152,021 | A | | 5/1979 | Götz et al. | 296/37.1 |
| 4,174,766 | A | * | 11/1979 | Kalogerson | 340/439 |
| 4,289,924 | A | * | 9/1981 | Pearce et al. | 174/152 G |
| 4,457,482 | A | * | 7/1984 | Kitagawa | 248/74.3 |
| 4,601,510 | A | | 7/1986 | Schöppel et al. | 296/194 |
| 4,767,350 | A | * | 8/1988 | Cooper et al. | 439/271 |
| 4,779,577 | A | * | 10/1988 | Ritter et al. | 123/41.05 |
| 4,918,261 | A | * | 4/1990 | Takahashi et al. | 174/135 |
| 4,923,537 | A | * | 5/1990 | Matsushima | 156/48 |
| 5,071,143 | A | * | 12/1991 | Byerly et al. | 277/606 |
| H1031 | H | * | 3/1992 | Notorgiacomo, Jr. | 524/412 |
| 5,117,511 | A | * | 6/1992 | Smith | 4/114.1 |
| 5,156,230 | A | * | 10/1992 | Washburn | 180/170 |
| 5,170,017 | A | * | 12/1992 | Stanevich et al. | 174/153 G |
| 5,197,903 | A | * | 3/1993 | Casey et al. | 439/564 |
| 5,297,334 | A | * | 3/1994 | Johnson | 29/861 |
| 5,324,203 | A | * | 6/1994 | Sano et al. | 439/34 |
| 5,417,471 | A | | 5/1995 | Kreis et al. | 296/194 |
| 5,442,518 | A | * | 8/1995 | Beam | 361/690 |
| 5,467,520 | A | * | 11/1995 | Nunez et al. | 29/564.6 |
| 5,671,802 | A | | 9/1997 | Rogers | 165/41 |
| 5,678,877 | A | * | 10/1997 | Nishijima et al. | 296/70 |
| 5,715,140 | A | * | 2/1998 | Sinkunas et al. | 361/690 |

(Continued)

FOREIGN PATENT DOCUMENTS

DE 4341355 6/1994

(Continued)

*Primary Examiner*—H. Gutman
(74) *Attorney, Agent, or Firm*—Brinks Hofer Gilson & Lione (57) ABSTRACT

An electronic system generally includes a flatwire electronic site and a flatwire bus electronically connecting the flatwire electronic site to an electronic device in the engine compartment. The flatwire electronic site has a flexible substrate with electronic components attached to the substrate for operation of the electronic device. The flatwire electronic site is mounted to the passenger site of the bulkhead for thermal cooling as well as protection from the harsh environment of the engine compartment. The bulkhead has an aperture sized to allow the flatwire bus to pass through the bulkhead into the engine compartment. By utilizing a flatwire bus, this aperture is small in size and the integrity of the bulkhead is improved.

21 Claims, 6 Drawing Sheets

U.S. PATENT DOCUMENTS

| | | | |
|---|---|---|---|
| 5,785,532 A * | 7/1998 | Maue et al. | 439/34 |
| 5,811,732 A * | 9/1998 | Beam | 174/72 A |
| 5,969,480 A * | 10/1999 | Schmolla et al. | 315/209 M |
| 5,979,965 A * | 11/1999 | Nishijima et al. | 296/70 |
| 6,108,193 A | 8/2000 | Haberstroh | 361/600 |
| 6,186,106 B1 | 2/2001 | Glovatsky et al. | 123/143 |
| 6,236,919 B1 * | 5/2001 | Corbin et al. | 701/36 |
| 6,250,706 B1 * | 6/2001 | Davis et al. | 296/70 |
| 6,265,788 B1 * | 7/2001 | Davidson et al. | 307/11 |
| 6,279,527 B1 | 8/2001 | Glovatsky et al. | 123/143 |
| 6,474,716 B1 * | 11/2002 | Shikata et al. | 296/70 |
| 6,561,465 B1 * | 5/2003 | Kondo | 248/74.3 |
| 6,643,918 B1 * | 11/2003 | Ortiz et al. | 29/825 |
| 6,669,273 B1 * | 12/2003 | Glovatsky et al. | 296/193.02 |
| 6,695,374 B1 * | 2/2004 | Gebreselassie et al. | 180/90 |
| 6,705,671 B1 * | 3/2004 | Glovatsky et al. | 296/193.02 |
| 6,807,060 B1 * | 10/2004 | Glovatsky et al. | 361/707 |
| 6,883,628 B1 * | 4/2005 | Mizukami et al. | 180/90 |
| 2002/0145309 A1 * | 10/2002 | Shikata et al. | 296/208 |
| 2003/0094831 A1 * | 5/2003 | Kondo et al. | 296/70 |
| 2004/0041432 A1 * | 3/2004 | Baker et al. | 296/70 |

FOREIGN PATENT DOCUMENTS

DE             19524165       8/1996

* cited by examiner

UNDERHOOD ELECTRONIC INTERIOR INTEGRATION

TECHNICAL FIELD

The present invention generally relates to underhood electronics in a motor vehicle, and more particularly relates to integration of these electronics in the vehicle interior.

BACKGROUND OF THE INVENTION

Underhood electronics are becoming more prevalent as more functions are contained under hood, such as antilock braking system, engine control, transmission control, variable valve timing, as well as numerous sensors and actuators. Currently, heavily sealed modules are installed underhood which are used to house various electronic boxes. These modules are very costly due to the high level of sealing and protection required, as well as the need for cooling of the electronics. Typically these modules include aluminum cast housings with cooling features, as well as a significant amount of bracketry to support the electronic boxes in the entire module. Further, these modules require connectors, pigtails, and wiring harnesses that are associated with each of the underhood electronic devices. Accordingly, there exits a need to provide an electronic system for the underhood devices of a motor vehicle which reduces the costs, packaging, volume and weight of the system, while increasing the serviceability and packaging efficiency of the system.

BRIEF SUMMARY OF THE INVENTION

The present invention provides an electronic system for a motor vehicle having a bulkhead separating engine compartment and a passenger compartment, the engine compartment having an electronic device for performing a vehicle function. The electronic system generally includes a flatwire electronic site and a flatwire bus electronically connecting the flatwire electronic site and the electronic device in the engine compartment. The flatwire electronic site has a flexible substrate with electronic components attached to the substrate for operation of the electronic device. The flatwire electronic site is mounted to the passenger site of the bulkhead. This location of the electronic site provides thermal cooling as well as protection from the harsh environment of the engine compartment. The bulkhead has an aperture sized to allow the flatwire bus to pass through the bulkhead into the engine compartment. By utilizing a flatwire bus, this aperture is small in size and the integrity of the bulkhead is improved.

The system may further include a cover for protecting the flatwire electronic site. The cover includes an open side that faces the bulkhead, and the flatwire electronic site may be mounted directly to the bulkhead or bonded to the interior of the cover. The cover, in conjunction with the bulkhead, provides protection to the flatwire electronic site. This eliminates the need to seal the electronic components of the flatwire electronic site with a conformal coating.

A number of flatwire electronic sites may be mounted to the passenger side of the bulkhead, and multiple flatwire busses may be stacked together and pass through the aperture in the bulkhead. A gasket may be utilized which receives the flatwire bus and is positioned to engage the aperture in the bulkhead. The gasket preferably seals the flatwire to the bulkhead. The gasket may include an upper jaw hingedly connected to a lower jaw which is operable between open and closed positions for selectively inserting or removing the flatwire bus.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 6 is a perspective view showing three flatwire busses attached to a gasket while

DETAILED DESCRIPTION OF THE INVENTION

Figure 1:
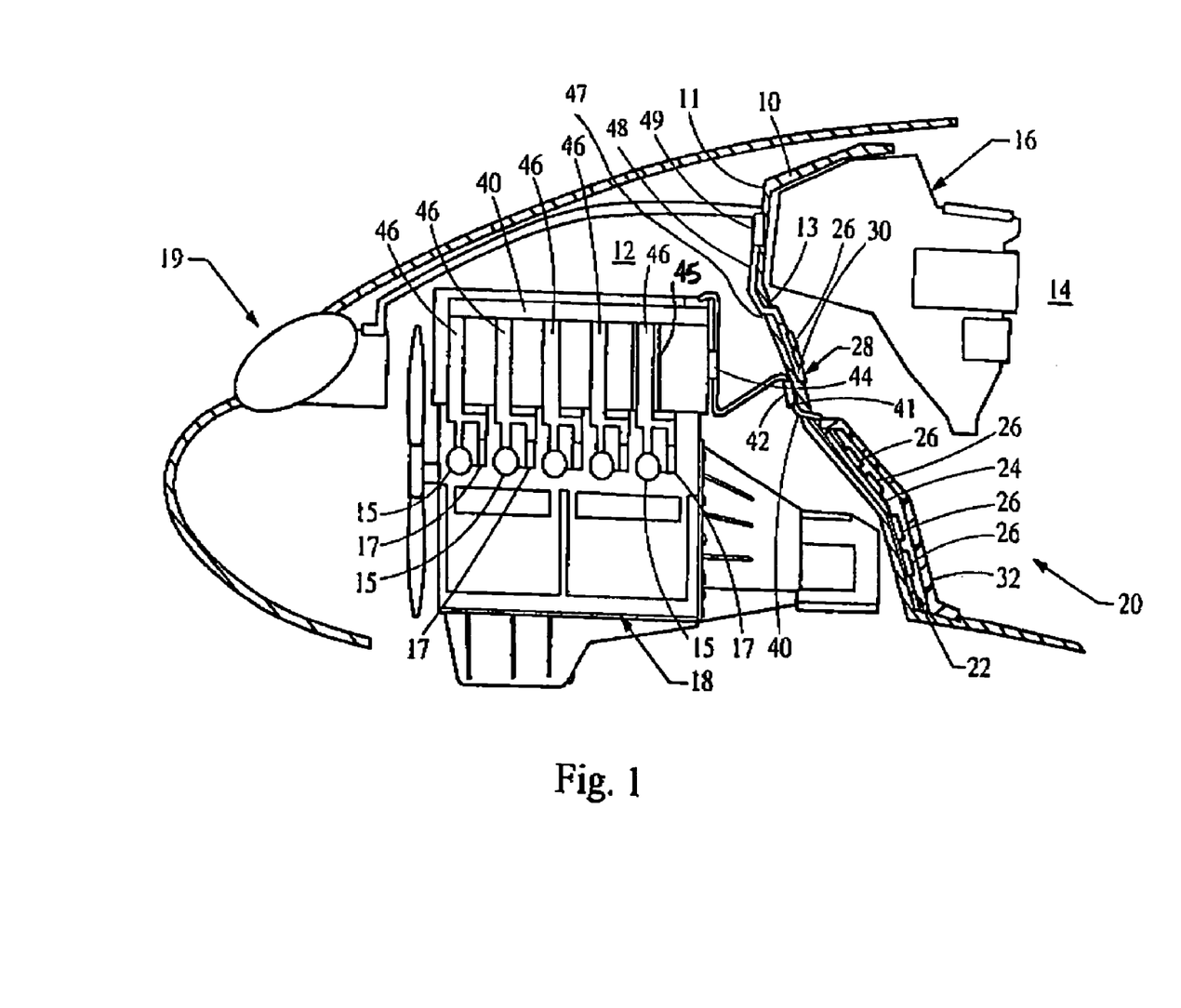
FIG. 1 is a cross-sectional view of an electronic system for underhood electronic devices constructed in accordance with the teachings of the present invention.

Turing now to the figures, FIG. 1 depicts a cross-sectional view of an electronic system 20 constructed according to the present invention. The electronic system is for a motor vehicle having a bulkhead 10 separating an engine compartment 12 from a passenger compartment 14. Accordingly, the bulkhead 10 has an engine side 11 and a passenger side 13. The passenger compartment 14 includes a vehicle cockpit structure 16. The engine compartment includes various electronic devices for performing one or more vehicle functions. In FIG. 1, the electronic devices have been depicted as both ignition coils 15 and fuel injectors 17 for an internal combustion engine 18. An additional electronic device includes a lighting module or modules 19 for the front lights of the vehicle.

The electronic system 20 includes a flatwire electronic site 22 having a substrate 24 with a plurality of electronic components 26 attached thereto. The electronic components 26 are utilized to operate the electronic devices 15, 17, 19. It will be recognized that typical underhood electronic devices such as an engine control unit, anti-lock braking systems, speed control, ignition, lighting, transmission control, powertrain control, as well as various sensors or other actuators can be employed with the teachings of the present invention. Preferably, the electronic site 22 or a plurality of electronic sites 22 can be utilized to perform all of the underhood functions and features. In this way, control of the underhood electronic devices is integrated.

The flatwire electronic site 22 is attached to the bulkhead 10, and more particularly the passenger side 13 of the bulkhead 10. The electronic site 22 may be attached to the bulkhead 10 in numerous ways such as adhesively or mechanically. For example, a thermal adhesive or thermal grease may be used in order to promote cooling of the electronic components 26 through the bulkhead 10. Alternately, mechanical attachment structures such as hook and loop fasteners, dips, screws, push-pins, clamps and the like may be utilized. A cover 32 includes an open side which faces the bulkhead 10 and is attached directly thereto. The bulkhead 10, in combination with the cover 32, encloses the electronic site 22 and protects the same from the environment. The present invention thus improves the reliability of the functions of the electronic sites 22 by locating them in a benign environment of the passenger compartment 14. As such, the electronic components 26 do not need to be sealed with a protective conformal coating. Further, mounting the electronic sites 22 to the bulkhead provides for excellent heat transfer and cooler electronics.

A second flatwire electronic site 28 is also mounted to the passenger side 13 of the bulkhead 10. The second electronic site 28 is mounted above the first electronic site 22 and behind the cockpit structure 16. Accordingly, the second electronic site 28 does not require a cover as the cockpit structure 16 provides protection thereto. The second flatwire site 28 includes a substrate 30 having electronic components 26 attached thereto for one or more vehicle functions.

Flatwire wire busses are utilized to provide circuitry to the electronic system 20. Specifically, a first flatwire bus 40 is electronically connected to the site 22, preferably by way of direct soldering, with or without a patch. Alternatively, flatwire connectors may be utilized to link the site 22 and bus 40, as is known in the art. The flatwire bus 40 passes through an aperture 41 formed in the bulkhead 10, and is then attached to the engine side 11 of the bulkhead 10 by a retaining clip 42. The flatwire bus 40 extends to the engine 18 and is attached thereto with a second clip 44. The flatwire bus includes flatwire takeouts 46 which directly connect the electronic site 22 to the electronic device within the engine compartment 12. As shown in FIG. 1, the flatwire takeouts 46 link the electronic site 22 to each of the ignition coils 15 and injectors 17 of the engine 18. The second flatwire site 28 is attached to a second flatwire bus 48 which passes through an aperture 47 formed in the bulkhead 10. The flatwire bus 48 is attached to the engine side 11 of the bulkhead by a clip 49 and extends through the engine compartment 12 to the lighting system 19 for operation thereof. The flatwire busses and takeouts in the engine compartment 12 may include an additional coating 45 such as a silicon coating, heavy coverlet coating, or in-dash molding for further protection.

Figure 2:
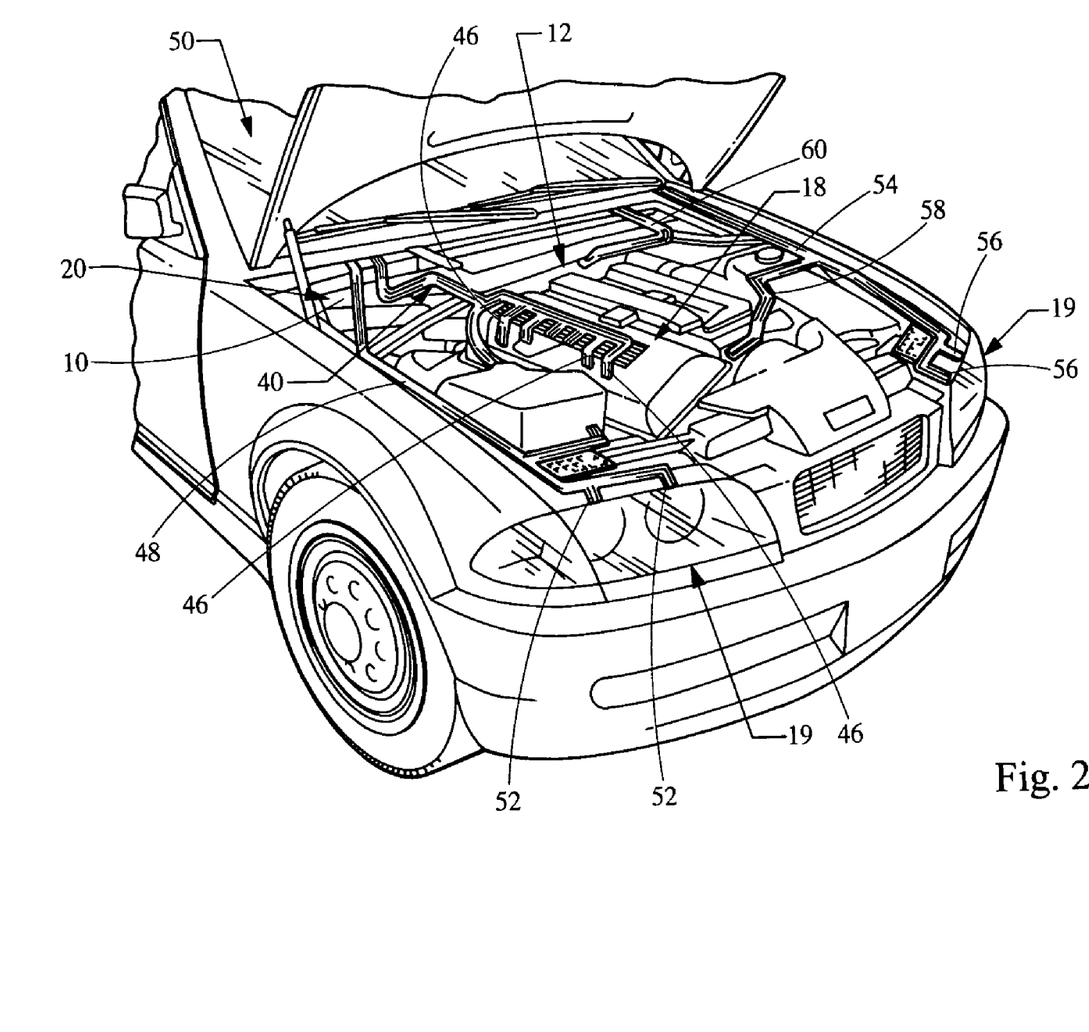
FIG. 2 is a perspective view showing the electronic system as it extends into the engine compartment of a vehicle.

Turning now to FIG. 2, a perspective view of the electronic system 20 is shown applied to the vehicle 50. The engine compartment 12 is separated from the passenger compartment by the bulkhead 10. The first flatwire bus 40 extends through the bulkhead and is directly mounted to the engine 18 where the flatwire takeouts 46 are connected to the ignition coils 15 and injectors 17 of the engine 18. Further, the second flatwire bus 48 extends through the bulkhead 10 into the engine compartment 12 and includes flatwire tails 52 which are connected to the lighting system 19. It can also be seen that a third flatwire bus 54 extends through the bulkhead 10 to a position where flatwire tails 56 are connected to the driver side light of the lighting system 19. An additional flatwire takeout 58 extends from the flatwire bus 54 to another electronic device within the engine compartment 12, such as engine control, transmission control, variable valve timing, anti-lock braking system, or any other sensor or actuator. Finally, a fourth flatwire bus 60 extends through the bulkhead 10 of the vehicle 50 for connection to another electronic device.

Figure 3:
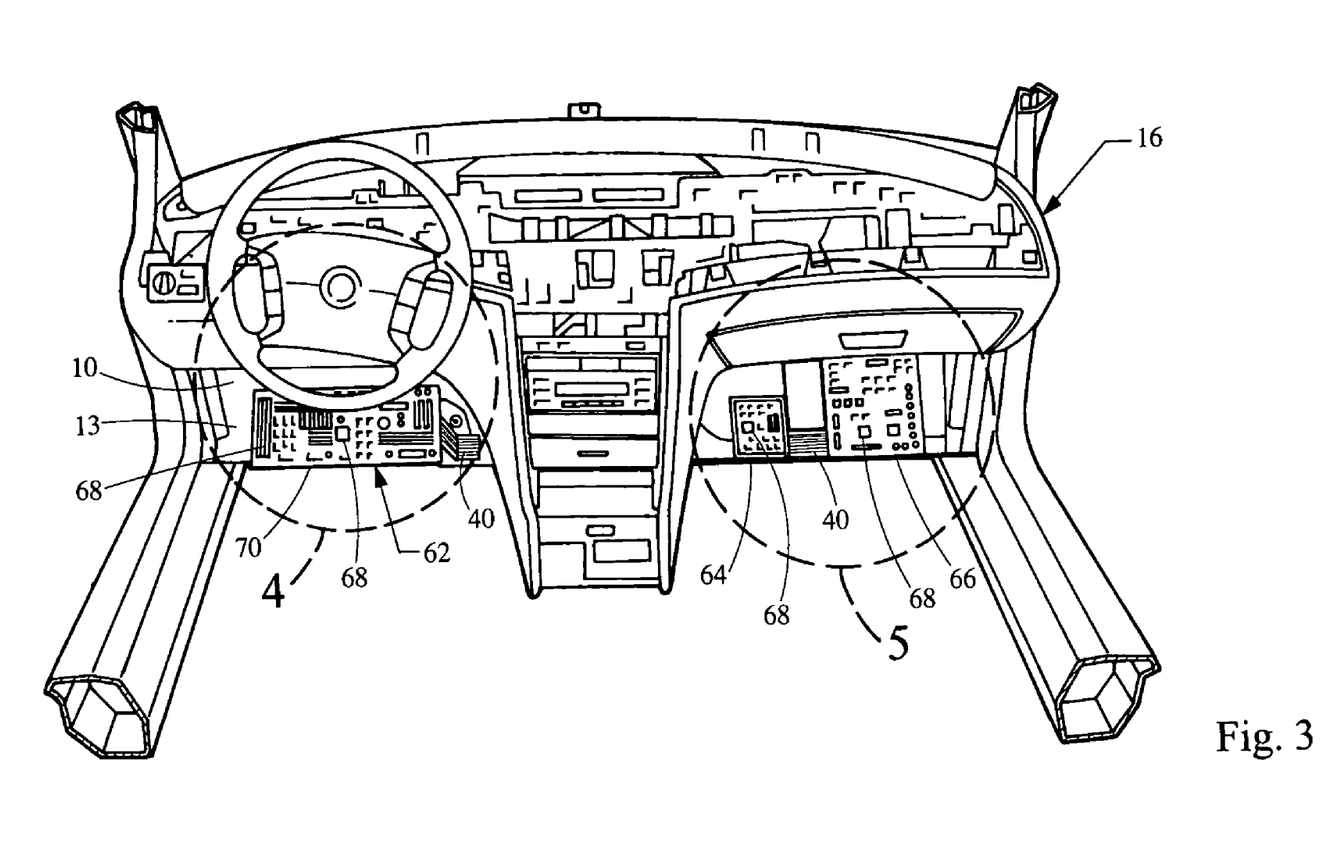
FIG. 3 is a front view depicting flatwire electronic sites of the electronic system mounted to the bulkhead.

As shown in the front view of FIG. 3, the vehicle bulkhead 10 includes a passenger side 13 to which there is mounted first, second, and third flatwire electronic sites 62, 64, 66, respectively. The flatwire sites 62, 64, 66 are mounted directly to the bulkhead 10 and have been shown exposed without any covers to reveal the electronic components 68 thereof. These flatwire electronic sites 62, 64, 66 are positioned along the base 70 of the bulkhead 10 and thus are unprotected by the cockpit structure 16 of the vehicle. It will be remembered and as shown in FIG. 1 that additional flatwire electronic sites may be located behind the cockpit structure 16 and may not require any coverage for protection.

Figure 4:
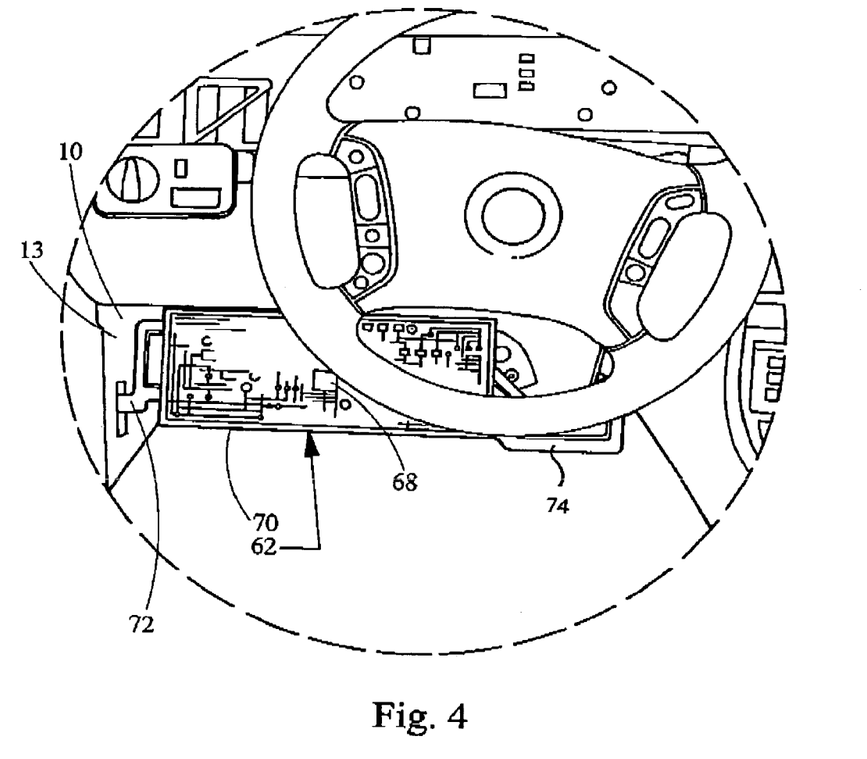
FIG. 4 is an enlarged view, partially cut away, of a flatwire electronic site shown in FIG. 3.
Figure 5:
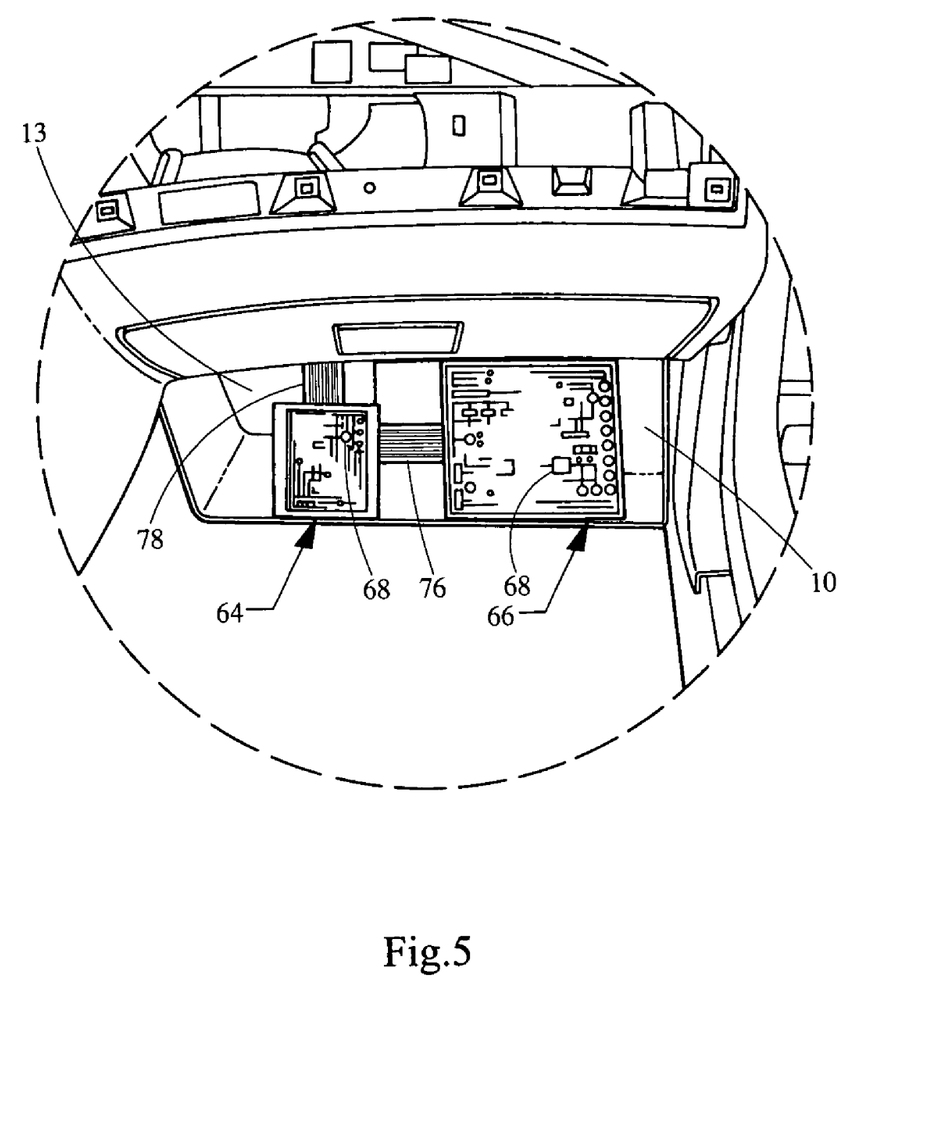
FIG. 5 is an enlarged view, partially cut away, of another flatwire electronic site shown in FIG. 3.

As shown in the enlarged, partially cut-away, view of FIG. 4, the first flatwire electronic site 62 is attached to the bulkhead 10 and includes a flatwire takeout 72 connected directly thereto for electronic communication directly to a device. A flatwire bus 74 extends from the opposing side of the electronic site 62 and passes through the bulkhead 10. Similarly, FIG. 5 is an enlarged view, partially cut-away, depicting the second and third flatwire electronic sites 64, 66. A flatwire bus 76 extends between the sites 64, 66 and another flatwire bus 78 extends from the second electronic site 64 through the bulkhead 10 into the engine compartment.

Figure 6:
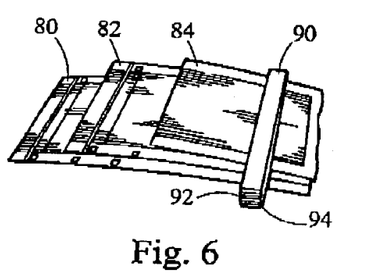
Figure 6A:
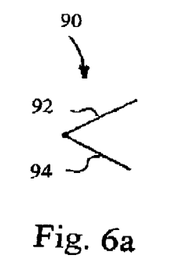
FIG. 6a is a cross-sectional view of the gasket in its open position.
Figure 7:
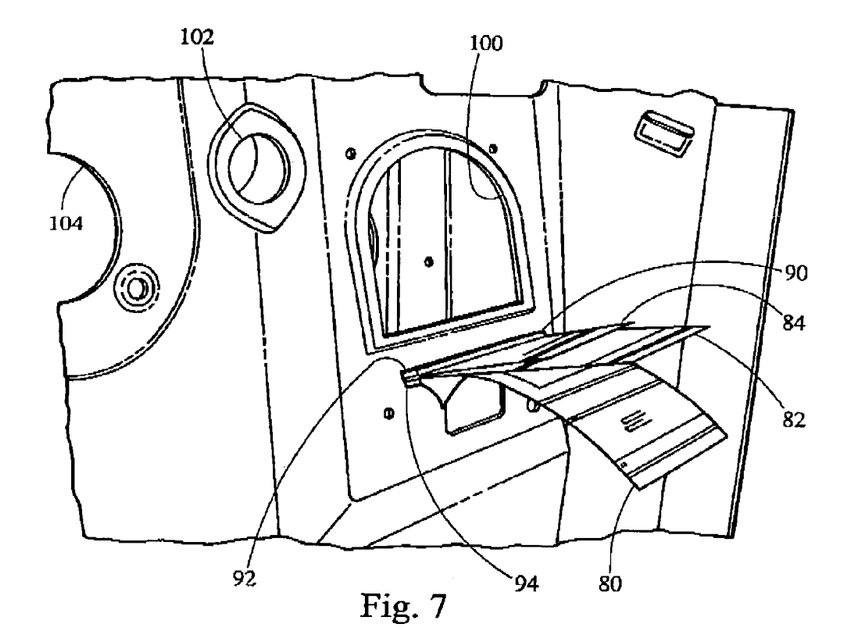
FIG. 7 is a perspective view showing the flatwire busses and gasket of FIG. 6 attached to the vehicle bulkhead.

Turning now to FIG. 6, three flatwire busses 80, 82, 84 are shown stacked together. A gasket 90 is attached around the flatwire busses 80, 82, 84 and connects them together. The gasket 90 preferably includes an upper arm 92 which is pivotally attached by hinge 93 to a lower arm 94. The gasket 90 is thus operable between an open position where the arms 92, 94 are spaced apart in order to position the flatwire busses 80, 82, 84 inside the gasket 90 (as shown in FIG. 6a), whereupon it is moved to a closed position as shown in FIG. 6. FIG. 7 shows the flatwire busses 80, 82, 84 and gasket 90 of FIG. 6 attached to the bulkhead 10. The gasket 90 engages an aperture 100 in the bulkhead 10, and seals the flatwire busses thereto.

The aperture 100, as well as apertures 102 and 104, are the passthrough apertures which were previously used for wiring from the engine compartment 12 to the passenger compartment 14. By way of the present invention, these three apertures 100, 102, 104 may be replaced by a single aperture which is sized to closely receive the gasket 90. A small rectangular aperture is all that is required to provide pass-through electronics. In this manner, the size of the passthrough openings can be greatly reduced thereby improving the integrity of the bulkhead 10. Further, the present invention allows the underhood electronics to be housed within the passenger compartment 14 of the vehicle, thereby providing a more benign and safe environment for these electronic sites. Further, by mounting the electronic sites directly to the bulkhead, a thermally conductive path is formed providing for cooler electronics which are more reliable and have greater longevity.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An electronic system for a motor vehicle having a bulkhead separating an engine compartment and a passenger compartment, the bulkhead having an engine side and a passenger side, the engine compartment having an electronic device for performing a vehicle function, the electronic system comprising:
   a flatwire electronic site having a flexible substrate and electronic components attached to the substrate for operation of the electronic device;
   a flatwire bus electronically connected to the flatwire electronic site and the electronic device in the engine compartment for transmitting signals therebetween;
   the flatwire electronic site being mounted to the passenger side of the bulkhead; and
   the bulkhead having an aperture, the flatwire bus passing through the aperture in the bulkhead and into the engine compartment.

2. The electronic system of claim 1, wherein the flatwire electronic site is mounted directly to the bulkhead for cooling of the electronic components.

3. The electronic system of claim 1, further comprising a cover connected to the bulkhead for protecting the flatwire electronic site.

4. The electronic system of claim 3, wherein the cover includes an open side that faces the bulkhead.

5. The electronic system of claim 1, wherein the aperture is sized to closely correspond to the circumferential size of the flatwire bus.

6. The electronic system of claim 1, wherein the flatwire bus links the flatwire electronic site to a second flatwire electronic site.

7. The electronic system of claim 6, wherein the flatwire bus includes flatwire tails linking the flatwire electronic sites to the electronic device.

8. The electronic system of claim 1, wherein the electronic components of the flatwire electronic site are not sealed with a conformal coating.

9. The electronic system of claim 1, wherein a portion of the flatwire bus located in the engine compartment includes an additional coating for protection.

10. The electronic system of claim 1, further comprising a second flatwire bus electronically connecting the flatwire electronic site to a second electronic device in the engine compartment.

11. The electronic system of claim 10, wherein the flatwire busses are stacked together and pass through the aperture in the bulkhead.

12. The electronic system of claim 1, further comprising a second flatwire bus electronically connecting a second flatwire electronic site to a second electronic device in the engine compartment, the flatwire busses being stacked together and passing through the aperture in the bulkhead.

13. The electronic system of claim 1, further comprising a gasket receiving the flatwire bus and positioned to engage the aperture in the bulkhead.

14. The electronic system of claim 13, wherein the gasket seals the flatwire bus to the bulkhead.

15. The electronic system of claim 13, wherein the gasket includes an upper jaw hingedly connected to a lower jaw, the gasket operable between an open position for placing the flatwire bus therein and a closed position for sealing the flatwire bus to the bulkhead.

16. The electronic system of claim 13, further comprising a second flatwire bus, wherein the flatwire wire busses are stacked together and positioned within the gasket for passage through the aperture in the bulkhead.

17. An electronic system for a motor vehicle having a bulkhead separating an engine compartment and a passenger compartment, the bulkhead having an engine side and a passenger side, the engine compartment having an electronic device for performing a vehicle function, the electronic system comprising:
   a flatwire electronic site having a flexible substrate and electronic components attached to the substrate for operation of the electronic device;
   a flatwire bus electronically connected to the flatwire electronic site and the electronic device in the engine compartment for transmitting signals therebetween;
   the flatwire electronic site being mounted directly to the passenger side of the bulkhead for cooling of the electronic components;
   the bulkhead having an aperture, the flatwire bus passing through the aperture in the bulkhead and into the engine compartment, and
   a gasket receiving the flatwire bus and positioned to engage the aperture in the bulkhead.

18. The electronic system of claim 17, further comprising a second flatwire bus, wherein the flatwire wire busses are stacked together and positioned within the gasket for passage through the aperture in the bulkhead.

19. The electronic system of claim 17, wherein the entire flatwire electronic site is positioned on the passenger side of the bulkhead.

20. The electronic system of claim 17, wherein the gasket includes an upper jaw hingedly connected to a lower jaw, the gasket operable between an open position for placing the flatwire bus therein and a closed position for sealing the flatwire bus to the bulkhead.

21. The electronic system of claim 1, wherein the entire flatwire electronic site is positioned on the passenger side of the bulkhead.

* * * * *